(12) United States Patent
Baek (10) Patent No.: US 11,208,005 B2
(45) Date of Patent: Dec. 28, 2021

(54) AUTOMATIC APS MAP GENERATING METHOD AND SYSTEM

(71) Applicants: Hyundai Motor Company, Seoul (KR); Kia Motors Corporation, Seoul (KR)

(72) Inventor: Jong Kil Baek, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 16/540,744

(22) Filed: Aug. 14, 2019

(65) Prior Publication Data
US 2020/0180467 A1 Jun. 11, 2020

(30) Foreign Application Priority Data
Dec. 6, 2018 (KR) .......................... 10-2018-0155692

(51) Int. Cl.
*B60L 58/12* (2019.01)
*B60W 30/18* (2012.01)
*B60W 40/10* (2012.01)
*B60W 10/08* (2006.01)

(52) U.S. Cl.
CPC ............ *B60L 58/12* (2019.02); *B60W 10/08* (2013.01); *B60W 30/18063* (2013.01); *B60W 40/10* (2013.01); *B60W 2510/244* (2013.01); *B60W 2540/10* (2013.01); *B60W 2710/083* (2013.01)

(58) Field of Classification Search
CPC ...... B60L 58/12; B60L 15/20; B60L 2250/26; B60L 2340/423; B60L 15/2063; B60L 2250/28; B60L 2240/12; B60W 30/18063; B60W 40/10; B60W 10/08; B60W 2540/10; B60W 2710/083; B60W 2510/244; B60W 50/0098; B60W 2050/0083; Y02T 10/72; Y02T 10/64; Y02T 10/70; G01R 31/382; B60Y 2200/91
See application file for complete search history.

(56) References Cited

U.S. PATENT DOCUMENTS

| | | | | |
|---|---|---|---|---|
| 7,295,918 B2 * | 11/2007 | Nada | ..................... | B60W 10/06 701/116 |
| 2010/0076637 A1 * | 3/2010 | Ueoka | ................... | B60K 6/442 701/22 |
| 2013/0079967 A1 * | 3/2013 | Terakawa | .............. | B60W 10/02 701/22 |
| 2013/0196816 A1 * | 8/2013 | Natsume | ............... | B60W 20/00 477/3 |

* cited by examiner

*Primary Examiner* — Marthe Y Marc-Coleman
(74) *Attorney, Agent, or Firm* — Mintz Levin Cohn Ferris Glovsky and Popeo, P.C.; Peter F. Corless (57) ABSTRACT

An automatic APS map generating method is provided. The automatic APS map generating method includes measuring a state of charge (SOC) of a battery using a SOC sensor and calculating, a maximum torque of a motor based on the battery SOC and a creep torque based on a current vehicle state to set the creep torque as a minimum torque of the motor. An APS map is generated using an APS percentage table obtained and stored by converting torque values capable of being output by the motor into percentages based on a vehicle speed and an accelerator pedal position sensor (APS) percentage.

17 Claims, 5 Drawing Sheets

AUTOMATIC APS MAP GENERATING METHOD AND SYSTEM

CROSS REFERENCE TO RELATED APPLICATION

The present application claims priority to Korean Patent Application No. 10-2018-0155692, filed on Dec. 6, 2018, the entire contents of which is incorporated herein for all purposes by this reference.

BACKGROUND

Technical Field

The present disclosure relates to an automatic accelerator pedal position sensor (APS) map generating method and system, and more particularly, to an automatic APS map generating method that automatically generates an APS map using an APS percentage table.

Description of the Related Art

In an electric vehicle (EV) in which the motor is the main power source, the output of the vehicle is related to the torque of the motor. With the recent development of battery technology, the capacity and output of the battery mounted within the electric vehicle are increasing. Generally, the torque output from the motor of the electric vehicle may be determined by the torque value calculated based on the degree by which the driver depresses or engages the accelerator pedal. Accordingly, a plurality of accelerator pedal position sensor (APS) maps corresponding to various states of the vehicle are generated to calculate a torque value required for the motor based on the degree by which the driver depresses the accelerator pedal.

However, as the battery power is consumed, the maximum torque capable of being output by the motor is reduced. The general APS map is generated based on the maximum torque of the motor calculated based on the maximum capacity of the battery without considering the battery state of charge (SOC), thus the actual torque control is inaccurate. Accordingly, in the process of operating the motor, even when the accelerator pedal is further depressed, an invalid stroke phenomenon without variation in torque is generated.

SUMMARY

The present disclosure provides an automatic APS map generating method that generates an APS map reflecting a motor's maximum torque that depends on charging state of a battery and calculates a higher reliable required torque for a motor using the generated APS map.

The present disclosure provides an automatic APS map generating method that may include measuring a state of charge (SOC) of a battery using a SOC detector; calculating, by a controller, a maximum torque of a motor according to the battery SOC; calculating, by the controller, a creep torque based on a current vehicle state to set the creep torque as a minimum torque of the motor; and generating, by the controller, an APS map using an APS percentage table obtained and stored by converting torque values capable of being output by the motor into percentages based on a vehicle speed and an accelerator pedal position sensor (APS) percentage.

In one aspect, the generating of the APS map may include storing output torque values of the motor that are output according to the vehicle speed for each APS percentage, by applying the vehicle speed and the APS percentage matching a percentage of a torque capable of being output by the motor to the maximum torque and the minimum torque. In addition, the generating of the APS map may include generating a primary APS map by applying the percentage of the torque capable of being output by the motor to a value obtained by adding the maximum torque and the minimum torque; and generating a secondary APS map by subtracting the minimum torque from the torque of the motor derived from the primary APS.

The APS percentage may be obtained by converting an amount by which an accelerator pedal is depressed or engaged into a percentage. The APS percentage table may store percentages of the torque values capable of being output by the motor, thereby not being affected by a change in the battery SOC. The APS map generating method may further include calculating a required torque of the motor using the APS map. In particular, the calculating of the required torque of the motor using the APS map may include setting the vehicle speed and the APS percentage as input values using the APS percentage table to calculate a percentage of the torque value capable of being output by the motor for the input values; and calculating the required torque of the motor by applying the percentage of the torque value capable of being output by the motor to the maximum torque and the minimum torque according to the battery SOC. In addition, the APS map generating method may further include measuring the battery SOC again when the required torque of the motor is not between the maximum torque value and the minimum torque value of the torque capable of being output by the motor.

Further, the APS map generating method may further include monitoring the battery SOC in real time using the SOC detector to calculate the maximum torque of the motor again when the battery SOC is changed. The calculating of the creep torque based on the current vehicle state to set the creep torque as the minimum torque of the motor may include determining, by the controller, the current vehicle state based on a pedal step and a driving mode set by a driver in advance; and calculating the creep torque using a creep torque map in which the creep torque values are stored, based on the current vehicle state.

According to an exemplary embodiment of the present disclosure, an APS map reflecting the battery SOC detected in real time and the current vehicle state may be generated using the APS percentage table which is not affected by the battery SOC. Therefore, it may be possible to automatically generate the APS map reflecting the reduction of the maximum torque of the motor caused by the reduction of the battery SOC. According to an exemplary embodiment of the present disclosure, the APS map generating apparatus may automatically generate the APS map reflecting the maximum torque and minimum torque of the motor, which varies based on the battery SOC and the vehicle state, through battery SOC monitoring and vehicle condition monitoring in real time.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The advantages and features of the present disclosure and the manner of achieving them will become apparent with reference to the exemplary embodiments described in detail below with reference to the accompanying drawings. The present disclosure may, however, be embodied in many different forms and should not be construed as limited to the embodiments set forth herein. Rather, these exemplary embodiments are provided so that this disclosure will be thorough and complete, and will fully convey the concept of the disclosure to those skilled in the art. It is intended to be in all likelihood understood to fall within the scope of the disclosure. Like reference numerals refer to like elements throughout the specification.

The terms, such as "part", "unit", "module", and the like, which are described in the specification, mean a unit for processing at least one function or operation, or may be implemented by hardware, software, or a combination of hardware and software. In the present specification, the name of the configuration is divided into the first, the second, and so on in order to distinguish the names of the components from each other in the same relationship, and is not necessarily limited to the order in the following description.

The detailed description is illustrative of the disclosure. Furthermore, the foregoing is intended to illustrate and explain the exemplary embodiments of the present disclosure, and the present disclosure may be used in various other combinations, modifications, and environments. That is, it is possible to make changes or modifications within the scope of the concept of the disclosure disclosed in the present specification, equivalents to the disclosure and/or the scope of the art or knowledge of the present disclosure. The described exemplary embodiments are intended to be illustrative of the best mode for carrying out the technical idea of the present disclosure and various changes may be made in the specific applications and uses of the present disclosure. Therefore, the detailed description of the disclosure is not intended to limit the disclosure to the disclosed exemplary embodiments. It is also to be understood that the appended claims are intended to cover further exemplary embodiments.

Figure 1:
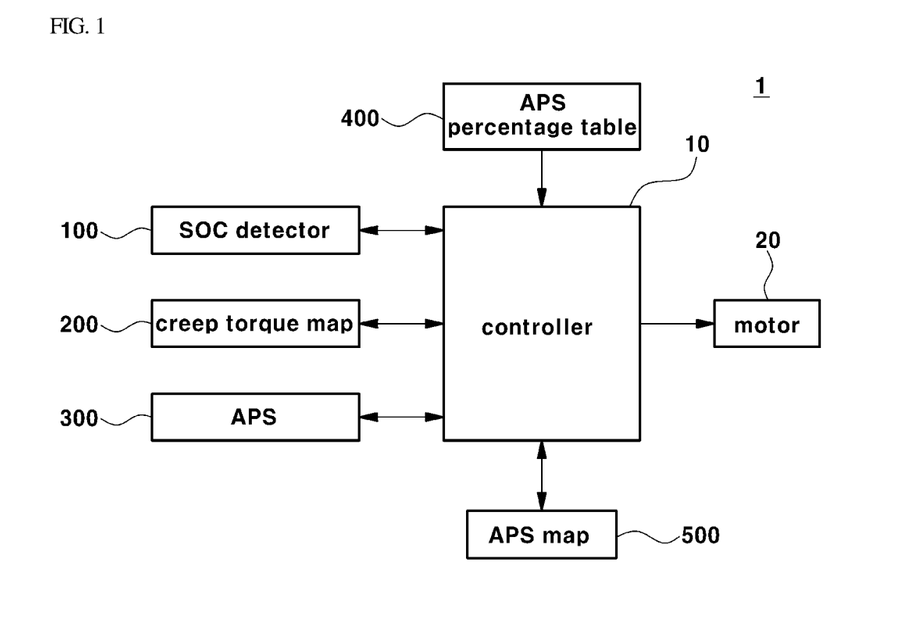
FIG. 1 is a block diagram showing an APS map generating apparatus according to an exemplary embodiment of the present disclosure.

FIG. 1 is a block diagram showing an APS map generating apparatus according to an exemplary embodiment of the present disclosure. Referring to FIG. 1, the APS map generating apparatus 1 may include a state of charge (SOC) detector 100, a creep torque map 200, an accelerator pedal position sensor (APS) 300, an APS percentage table 400, an APS map 500, a controller 10, and a motor 20.

Particularly, the SOC detector 100 may be configured to detect a SOC of a battery disposed in the vehicle. The SOC detector 100 may be configured to detect the battery SOC changed in real time and transmit the detected data to the controller 10. The capacity of the battery may be reduced as the vehicle is driven, and the maximum torque output from the motor 20 may be reduced as the capacity of the battery is reduced. Therefore, to determine the maximum torque output from the motor 20 in advance, the SOC detector 100 may be configured to monitor the battery SOC in real time.

The creep torque map 200 may match a creep torque value to the current vehicle state and then store the creep torque value. The current vehicle state may include driving modes of the vehicle and pedal steps (e.g., pedal engagement amounts). For example, the driving modes of the vehicle may include an Eco mode, a normal mode, and a sport mode, and the pedal steps may include a basic stage D0, a first stage D1, a second step D2, and a third step D3. The creep torque refers to a torque at the time of the creep driving. The creep driving refers to that the vehicle moves only by an idle revolutions per minute (RPM) of the engine or an electric power of the motor without depressing the accelerator pedal. When the road is blocked, or when the driver intends to decelerate the vehicle, the vehicle will be in the creep driving state.

Generally, the driver reduces the opening or engagement amount of the accelerator pedal (APS) to reduce the speed of the vehicle. When the accelerator pedal is completely released or disengaged, that is, when the opening amount of the accelerator pedal is 0%, the creep torque changes to the negative (−) area so that coast regeneration (e.g., energy regeneration during coast driving) is performed in electric vehicles. As a result, the motor torque is in the positive (+) region and then rapidly reduced to the negative (−) region when the opening amount of the accelerator pedal (APS) is changed to 0%, whereby the driver has a sense of deceleration. In other words, the creep torque may be expressed by a negative value and have different values based on the vehicle modes and pedal states. Further, the creep torque may have different values based on the change of the vehicle speed in any one vehicle mode and any one pedal state.

The APS 300 refers to the opening or engagement amount of the accelerator pedal and may be defined as a sensor configured to measure the opening amount of the accelerator pedal. In other words, the APS 300 may be configured to continuously monitor how much further the driver has depressed the accelerator pedal. The opening amount of the accelerator pedal may be converted into a percentage. For example, when the driver completely releases the accelerator pedal, the opening amount of the accelerator pedal (APS) may be 0%, and when the driver fully depresses the accelerator pedal, the opening amount of the accelerator pedal (APS) may be 100%. The APS 300 may be configured to transmit data regarding the opening amount of the accelerator pedal to the controller 10.

The controller 10 may be configured to generate an APS percentage table 400 based on data on the speed of the vehicle and data received from the APS 300. The controller 10 may be configured to execute the driving of the motor 20 and may include a motor control unit (MCU). The controller 10 may be configured to receive data from the SOC detector 100, the creep torque map 200, and the APS 300, and receive various data such as vehicle speed, vehicle temperature, and the like.

The APS percentage table 400 may be obtained and stored by converting the torque values capable of being output by the motor 20 into percentages based on the vehicle speed and the APS percentage. The APS percentage may be obtained by converting the amount by which the accelerator pedal is depressed or engaged, into a percentage. The vehicle speed may be data obtained from a separate vehicle speed sensor (not shown). Converting the torque values capable of being output by the motor 20 into a percentage means that the torque values capable of being output by the motor 20 may be set to values of 0 to 100 in a specific particular battery SOC. For example, when the motor 20 is capable of outputting a maximum of 400 Nm in a state where the battery is fully charged, the torque value may be obtained by converting a value of 400 Nm into a value of 100.

Even when the maximum torque capable of being output by the motor 20 depends on the battery SOC, the APS percentage table 400 may be generated based on the range of the torque value capable of being output by the motor 20 and thus is not affected by the change of the battery SOC. In other words, since the APS percentage table 400 stores the percentage of the torque value according to the specific vehicle speed and the specific APS value, the APS percentage table 400 may not be affected by the battery's maximum torque that depends on the battery SOC. In addition, when the maximum torque of the battery depends on the battery SOC, the controller 10 may be configured to generate an APS map 500 that outputs the current torque suitable for the motor 20 through the APS percentage table 400.

Additionally, the controller 10 may be configured to generate the APS map 500 using the APS percentage table 400. The APS map 500 may store the output torque values of the motor 20 output according to the vehicle speed for each APS percentage by applying the APS percentage table 400 to the maximum torque and the minimum torque of the motor 20. The output torque of the motor 20 is a value considering the current vehicle state, the battery SOC, the opening amount (APS) of the accelerator pedal, and the vehicle speed and refers to a torque required for the motor 20 in a specific situation. In other words, the controller 10 may be configured to derive, from the APS map 500, the current vehicle state, the battery SOC, the opening amount of the accelerator pedal (APS), and the output torque of the motor 20 in a specific situation. The derived output torque may be defined as a torque required for the motor 20.

When the SOC detector 100 detects the battery SOC in real time, the maximum torque capable of being output by the motor 20 varies based on the change of the battery SOC. In other words, the torque required for the motor 20 by the controller 10 (hereinafter, referral to as the required torque) may be varied based on the change of the battery SOC. However, since the APS percentage table 400 is not affected by the change of the battery SOC, the controller 10 applies the APS percentage table 400 to the calculated maximum torque and minimum torque of the motor 20, to generate the APS map 500 suitable for the current vehicle state. Herein, the controller 10 may be configured to calculate the maximum torque of the motor 20 based on the battery SOC detected by the SOC detector 100 and calculate the creep torque stored in the creep torque map 200, which matches the current vehicle state, as the minimum torque. Specifically, the APS percentage table 400 may be applied to the maximum and minimum torques of the motor 20 according to the equation below.

$$(\text{Max}TQ + CrpTQ) \times APS \text{ percentage} - CrpTQ = APS \text{ map}$$

wherein, MaxTQ denotes the maximum torque of the motor 20, and CrpTQ denotes the minimum torque of the motor 20, that is, the creep torque.

According to the above equation, the controller 10 may be configured to generate a primary APS map by applying a percentage of the torque capable of being output by the motor 20 to a value obtained by adding the maximum torque and minimum torque of the motor 20. The percentage of the torque capable of being output by the motor 20 may be a value calculated from the APS percentage table 400. The primary APS map may be obtained by calculating the output torque according to the APS percentage based on a value obtained by adding the minimum torque and maximum torque of the motor 20. Even when the APS is 0% and the vehicle speed is zero, the output torque of the motor 20 may be greater than zero. Accordingly, to correct such an error, the controller 10 may be configured to generate a secondary APS map by subtracting the minimum torque of the motor 20 from the primary APS map. The secondary APS map refers to the APS map 500 described in the present disclosure.

Further, the controller 10 may be configured to calculate, as the required torque of the motor 20, the output torque of the motor 20, which matches the current vehicle state, the battery SOC, the opening amount of the accelerator pedal (APS value), and the vehicle speed, in a specific situation, using the APS map 500. Specifically, the controller 10 may be configured to set the vehicle speed and the APS percentage as input values using the APS percentage table 400, and calculate a percentage of the torque value capable of being output by the motor 20 for each of the input values. Thereafter, the torque required for the motor 20 may be calculated by applying the percentage of the torque value capable of being output by the motor 20 to the maximum torque and minimum torque of the motor 20 according to the battery SOC. Herein, the SOC detector 100 may be configured to detect the SOC of the battery in real time and transmit data on the change of the battery SOC to the controller 10. The controller 10 may then be configured to output the new maximum torque of the motor 20 based on the battery SOC and calculate the new minimum torque of the motor 20 based on the battery SOC. In other words, the controller 10 may be configured to monitor the battery SOC in real time and generate a new APS map 500 when the battery SOC is changed. Herein, since the APS percentage table 400 is not changed, the controller 10 may be configured to rapidly generate the new APS map 500 according to the current vehicle state.

According to an exemplary embodiment of the present disclosure, the APS map generating apparatus 1 may be configured to generate a new APS map 500 based on the change of the vehicle state and the change of the battery SOC, using the APS percentage table 400 that is not affected by the change of the battery SOC. In particular, the APS map generating apparatus 1 may be configured to automatically generate the APS map 500 that reflects the maximum torque and the minimum torque of the motor 20 that depend on the change of the battery SOC and the vehicle state, through the battery SOC monitoring and the vehicle state monitoring in real time.

According to an exemplary embodiment of the present disclosure, since the output required for the motor is derived by reflecting the charging state of the battery, it may be possible to efficiently use the motor output. Accordingly, the acceleration performance and the power performance of the vehicle may be improved.

Figure 2:
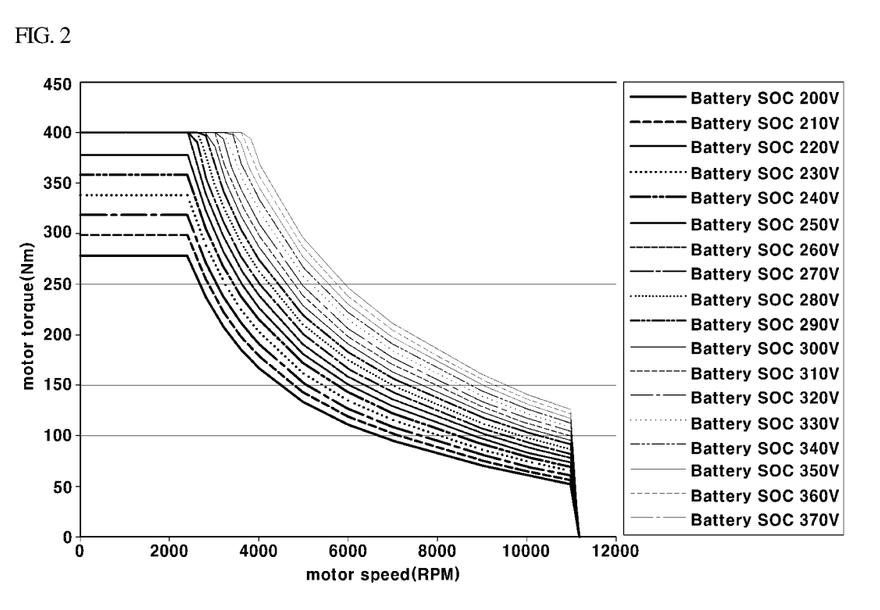
FIG. 2 is a graph showing a maximum torque of a motor according to the change of a battery SOC according to an exemplary embodiment of the present disclosure.

FIG. 2 is a graph showing a maximum torque of a motor according to the change of a battery SOC according to an exemplary embodiment of the present disclosure. In FIG. 2, an x axis indicates a rotational speed (RPM) of the motor 20, and a y axis indicates the maximum torque of the motor 20. Referring to FIGS. 1 and 2, the maximum torque capable of being output by the motor 20 may vary based on the change of the battery SOC. As the battery power is consumed, the maximum torque of the motor 20 may be reduced. For example, when the battery SOC is between about 260V and 370V, the maximum torque of the motor 20 may approach about 400 Nm. However, when the battery SOC is discharged to be less than about 260 V, the maximum torque of the motor 20 may be less than about 400 Nm.

Generally, the maximum torque of the motor 20 is calculated based on the maximum voltage of the battery. However, according to an exemplary embodiment of the present disclosure, the maximum torque of the motor 20 may be calculated based on the change of the battery SOC, and then the APS map 500 may be generated based on the maximum torque. The change of the battery SOC may be monitored in real time by the SOC detector 100 and the controller 10 may be configured to generate the APS map 500 reflecting the battery SOC.

Figure 3:
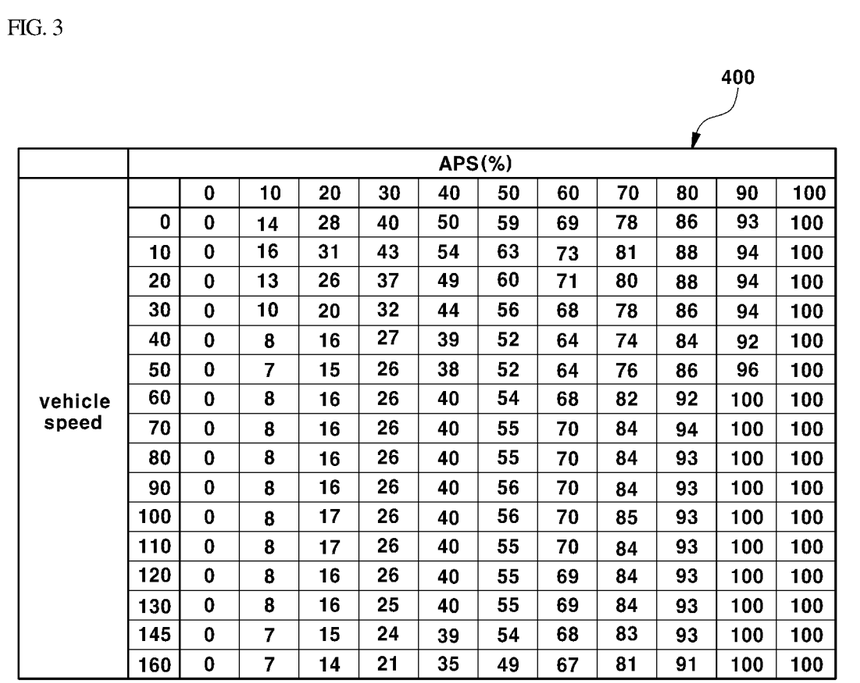
FIG. 3 is a diagram showing an APS percentage table according to an exemplary embodiment of the present disclosure.

FIG. 3 is a diagram showing an APS percentage table according to an exemplary embodiment of the present disclosure. In the table of FIG. 3, the x axis represents the degree by which the accelerator pedal (APS value) is depressed or engaged in a percentage, the y axis represents the vehicle speed, and the values shown in the table are obtained by converting the torque values capable of being output by the motor 20 into percentages.

Referring to FIGS. 1 and 3, the APS percentage table 400 may be obtained and stored by converting the torque values capable of being output by the motor 20 into percentages based on the vehicle speed and the APS percentage. Converting the torque values capable of being output by the motor 20 into percentages may mean that the torque values capable of being output by the motor 20 are set to values of 0 to 100 in a specific battery SOC. As an example, when the vehicle speed is about 50 and the APS percentage is about 50, then the derived percentage of the torque value of the motor 20 may be about 52. In particular, when calculating the required torque required for the motor 20, the controller 10 may be configured to calculate the required torque of the motor 20 by multiplying a value obtained by adding the maximum torque and the minimum torque of the motor 20 by a value of "0.52" and then subtracting the minimum torque from the result.

In other words, the APS map generating apparatus 1 according to an exemplary embodiment of the present disclosure may be configured to calculate the required torque of the motor 20 using the APS percentage table 400 even when the values of the maximum torque and the minimum torque of the motor 20 are changed. Even when values of the maximum torque and the minimum torque of the motor 20 are changed, the controller 10 may be configured to generate the APS map 500 using the APS percentage table 400 and determine a value matching the vehicle speed and the APS value from the APS map 500 as the required torque of the motor 20.

Figure 4:
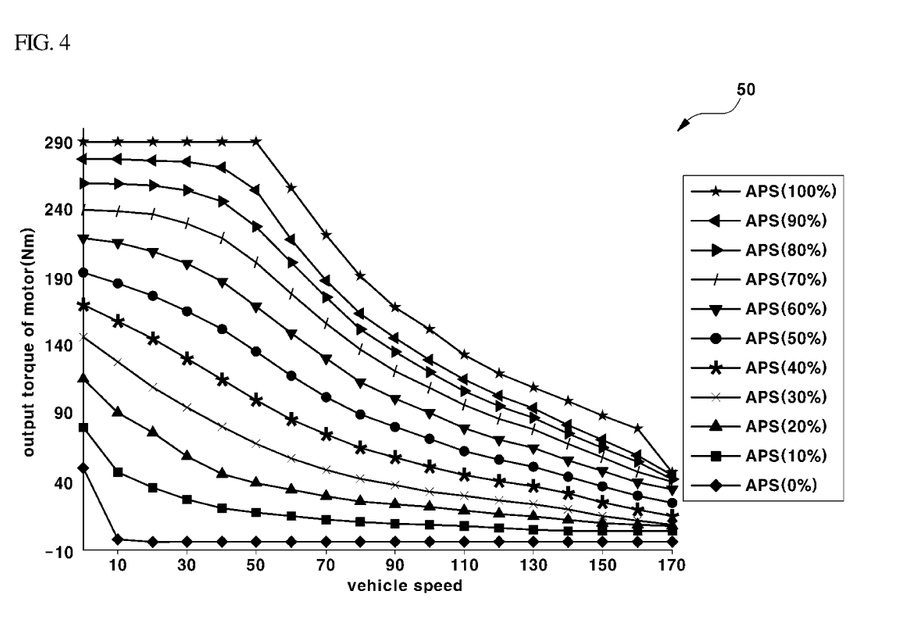
FIG. 4 is a diagram showing an APS map generated by an APS map generating apparatus according to an exemplary embodiment of the present disclosure.

FIG. 4 is a diagram showing an APS map generated by an APS map generating apparatus according to an exemplary embodiment of the present disclosure. In FIG. 4, an x axis represents the vehicle speed vehicle, and a y axis represents the output torque of the motor. Referring to FIGS. 1, 3 and 4, the controller 10 may be configured to generate the APS map 500 using the APS percentage table 400. The APS map 500 may represent an output torque value of the motor 20 with respect to the vehicle speed for each of APS values. FIG. 4 shows curves different from each other for each of the APS values. For example, when the APS value is 100%, the maximum torque of the motor 20 may be 290 Nm, and as the vehicle speed increases, the output torque value of the motor 20 may be reduced.

As another example, when the APS value is 0%, a value derived from the APS percentage table 400 in FIG. 3 is "0", and the output torque value of the motor 20 becomes a creep torque value having a positive value. In other words, in an exemplary embodiment of the present disclosure, the creep torque value may have a negative value, but the torque value of the motor 20 output when the APS value is 0% is equal to the creep torque value, and a direction of the applied force may be different. Since the APS map 500 according to an exemplary embodiment of the present disclosure stores the output torque values of the motor 20 according to the vehicle speed and the APS value, the controller 10 may be configured to rapidly calculate the required torque of the motor 20 in accordance with the vehicle state.

Figure 5:
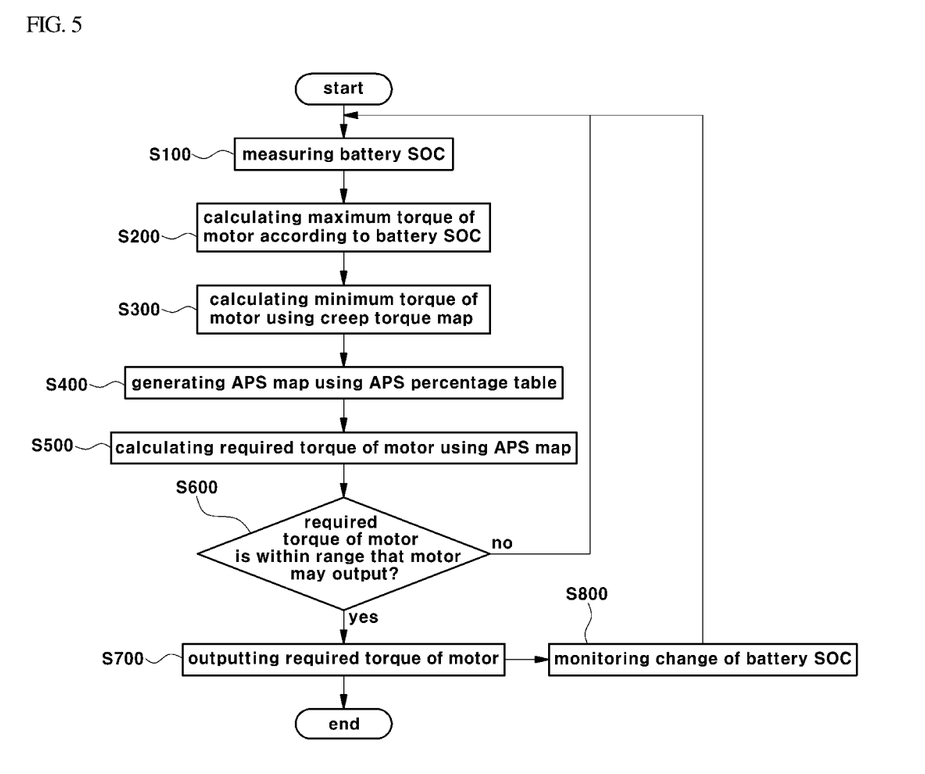
FIG. 5 is a flowchart showing an APS map generating method according to an exemplary embodiment of the present disclosure.

FIG. 5 is a flowchart showing an APS map generating method according to an exemplary embodiment of the present disclosure. Referring to FIGS. 1 and 5, the SOC calculation unit 100 may be configured to measure the battery SOC. The SOC calculation unit 100 may be configured to monitor the battery SOC in real time and transmit the monitored data to the controller 10 (S100).

The controller 10 may be configured to calculate the maximum torque of the motor 20 based on the battery SOC. The maximum torque of the motor 20 may vary based on the voltage that is capable of being currently output from the battery. Therefore, to calculate the required torque of the highly reliable motor 20, the controller 10 may be configured to calculate the maximum torque of the motor 20 based on the battery SOC and generate the APS map 500 based on the calculated maximum torque (S200). The controller 10 may be configured to calculate the creep torque value matching the current vehicle condition based on the creep torque values stored in the creep torque map 200 based on the vehicle state. The controller 10 may be configured to determine the calculated creep torque as the minimum torque (S300).

Further, the controller 10 may be configured to generate the APS map 500 using the APS percentage table 400 based on the current vehicle state. The controller 10 may also be configured to generate the APS map 500 using the creep torque determined based on the driving mode and the pedal state that are the current vehicle states and the maximum torque of the motor determined according to the change of the battery SOC. Herein, since the APS percentage table 400 is not affected by the current vehicle state and the battery SOC, the controller 10 may be configured to set only values of the maximum torque and the minimum torque of the motor 20 according to the change of the current vehicle state and the battery SOC and generate the APS map 500 by applying the values to the APS percentage table 400 (S400).

The controller 10 may be configured to calculate the required torque required for the motor 20 using the APS map 500. The required torque required for the motor 20 may be calculated based on the current vehicle state and the battery SOC, and the controller 10 may be configured to access the APS map 500 calculated in consideration of the current vehicle state and the battery SOC (S500). The controller 10 may then be configured to determine whether the calculated torque required for the motor 20 is within a range that the motor 20 may output. Herein, the range that the motor 20 may output may be between the maximum torque and the minimum torque capable of being output by the motor 20. For example, the maximum torque capable of being output by the motor 20 may be the maximum torque that may be output when the battery is fully charged (S600).

Additionally, the controller 10 may be configured to measure the battery SOC again when the required torque of the motor 20 is calculated based on the data of the battery SOC according to the rapid change in the battery capacity. When the APS map 500 is generated using the battery SOC according to the battery failure, the required torque of the motor 20 calculated through the APS map 500 has a value greater than the maximum torque capable of being output by the motor 20. Therefore, the controller 10 may be configured to measure the battery SOC again in response to determining that the calculated required torque of the motor 20 is abnormal. When the calculated required torque of the motor 20 is within the range that the motor 20 may output, the controller 10 may be configured to determine the calculated required torque as the required torque of the motor 20 and operate the motor 20 to output the required torque (S700, S800).

While the present disclosure has been described in connection with accompanying drawings, it will be understood by those skilled in the art that the present disclosure may be embodied in other specific forms without departing from the spirit or essential characteristics thereof. Therefore, it will be understood that the above-described exemplary embodiments are not limited but illustrative in all aspects and not restrictive.

What is claimed is:

1. An automatic accelerator pedal position sensor (APS) map generating method, comprising:
measuring, by a controller, a state of charge (SOC) of a battery using a SOC sensor;
calculating, by the controller, a maximum torque of a motor based on the battery SOC;
calculating, by the controller, a creep torque based on a current vehicle state to set the creep torque as a minimum torque of the motor; and
generating, by the controller, an APS map using an APS percentage table obtained and stored by converting torque values capable of being output by the motor into percentages based on a vehicle speed and an accelerator pedal position sensor (APS) percentage,
wherein the generating of the APS map includes storing, by the controller, output torque values of the motor that are output according to the vehicle speed for each APS percentage, by applying the vehicle speed and the APS percentage matching a percentage of a torque capable of being output by the motor to the maximum torque and the minimum torque.

2. The method of claim 1, wherein the generating of the APS map includes:
generating, by the controller, a primary APS map by applying the percentage of the torque capable of being output by the motor to a value obtained by adding the maximum torque and the minimum torque; and
generating, by the controller, a secondary APS map by subtracting the minimum torque from the torque of the motor derived from the primary APS.

3. The method of claim 1, wherein the APS percentage is obtained by converting an amount by which an accelerator pedal is depressed into a percentage.

4. The method of claim 1, wherein the APS percentage table stores percentages of the torque values capable of being output by the motor, thereby not being affected by a change in the battery SOC.

5. The method of claim 4, further comprising:
calculating, by the controller, a required torque of the motor using the APS map.

6. The method of claim 5, wherein the calculating of the required torque of the motor using the APS map includes:
setting, by the controller, the vehicle speed and the APS percentage as input values using the APS percentage table to calculate a percentage of the torque value capable of being output by the motor for the input values; and
calculating, by the controller, the required torque of the motor by applying the percentage of the torque value capable of being output by the motor to the maximum torque and the minimum torque according to the battery SOC.

7. The method of claim 6, further comprising:
measuring, by the controller, the battery SOC again when the required torque of the motor is not between the maximum torque value and the minimum torque value of the torque capable of being output by the motor.

8. The method of claim 6, further comprising:
monitoring, by the controller, the battery SOC in real time using the SOC sensor to calculate the maximum torque of the motor again when the battery SOC is changed.

9. The method of claim 1, wherein the calculating of the creep torque based on the current vehicle state to set the creep torque as the minimum torque of the motor includes:
determining, by the controller, the current vehicle state based on a pedal step and a driving mode set by a driver in advance; and
calculating, by the controller, the creep torque using a creep torque map in which the creep torque values are stored, based on the current vehicle state.

10. An automatic accelerator pedal position sensor (APS) map generating system, comprising:
a memory configured to store program instructions; and
a processor configured to execute the program instructions, the program instructions when executed configured to:
measure a state of charge (SOC) of a battery using a SOC sensor;
calculate a maximum torque of a motor based on the battery SOC;
calculate a creep torque based on a current vehicle state to set the creep torque as a minimum torque of the motor; and
generate an APS map using an APS percentage table obtained and stored by converting torque values capable of being output by the motor into percentages based on a vehicle speed and an accelerator pedal position sensor (APS) percentage,
wherein the APS percentage table stores percentages of the torque values capable of being output by the motor, thereby not being affected by a change in the battery SOC.

11. The system of claim 10, wherein the program instructions configured to generate the APS map are further configured to:
store output torque values of the motor that are output according to the vehicle speed for each APS percentage, by applying the vehicle speed and the APS percentage matching a percentage of a torque capable of being output by the motor to the maximum torque and the minimum torque.

12. The system of claim 10, wherein the program instructions configured to generate the APS map are further configured to:
generate a primary APS map by applying the percentage of the torque capable of being output by the motor to a value obtained by adding the maximum torque and the minimum torque; and
generate a secondary APS map by subtracting the minimum torque from the torque of the motor derived from the primary APS.

13. The system of claim 10, wherein the APS percentage is obtained by converting an amount by which an accelerator pedal is depressed into a percentage.

14. The system of claim 10, wherein the program instructions when executed are further configured to:
calculate a required torque of the motor using the APS map.

15. The system of claim 14, wherein the program instructions when executed are further configured to:
set the vehicle speed and the APS percentage as input values using the APS percentage table to calculate a percentage of the torque value capable of being output by the motor for the input values; and
calculate the required torque of the motor by applying the percentage of the torque value capable of being output by the motor to the maximum torque and the minimum torque according to the battery SOC.

16. The system of claim 15, wherein the program instructions when executed are further configured to:
measure the battery SOC again when the required torque of the motor is not between the maximum torque value and the minimum torque value of the torque capable of being output by the motor.

17. The system of claim 15, wherein the program instructions when executed are further configured to:
monitor the battery SOC in real time using the SOC sensor to calculate the maximum torque of the motor again when the battery SOC is changed.

\* \* \* \* \*